UNITED STATES PATENT OFFICE.

EDWARD WESTON, OF NEWARK, NEW JERSEY.

PLASTIC COMPOUND FROM SOLUBLE CELLULOSE.

SPECIFICATION forming part of Letters Patent No. 264,987, dated September 26, 1882.

Application filed March 7, 1882. (Specimens.)

*To all whom it may concern:*

Be it known that I, EDWARD WESTON, a subject of the Queen of Great Britain, and a resident of Newark, in the county of Essex and State of New Jersey, have invented a new and useful product or composition of matter, which I call "Non-Fibrous or Amorphous Cellulose," of which the following is a specification.

The new product which forms the subject of my invention is a tough, flexible, and homogeneous substance exhibiting many of the physical characteristics of ordinary celluloid, but differing therefrom with respect to its chemical composition, and to qualities that render it non-explosive and even less inflammable than cellulose as ordinarily obtained. It is, in fact, cellulose so far as its chemical composition is concerned, but cellulose without fibrous or other definite structure. When properly prepared it is transparent or translucent, and in this condition it is capable of a great number of uses, both as a substitute for celluloid, and also for special purposes, to which the latter is not applicable.

Cellulose in the form in which I have described it may be prepared from cellulose as it ordinarily appears—that is to say, as cotton, cotton waste, linen, or paper—the complete process being substantially as follows: A quantity of any of the above-mentioned materials—viz., cotton, linen, or paper—is immersed in a mixture of sulphuric and nitric acids, as in the usual preparation of pyroxyline, nitro-cellulose, or gun-cotton. The action of this mixture should be continued for twenty minutes, more or less, at the end of which time the cellulose has undergone a chemical change, becoming pyroxyline, its fibrous condition still remaining.

From the condition of pyroxyline it is best converted into collodion or celluloid, according to the solvents employed. If, for instance, the pyroxyline, after being properly washed and dried, be dissolved by a mixture of ether and alcohol, the product usually termed "collodion" is produced. If, on the other hand, the pyroxyline be dissolved with naphtha, nitro-benzol, or camphor alone, or with other solvents, the resulting product is known commercially as "celluloid." Both of these substances and the processes of manufacturing them are well known, and a more detailed account of their production is therefore unnecessary. It is, however, to be observed that neither exhibits any definite structural characteristics, being practically homogeneous or amorphous, that their fluid or plastic condition renders them capable of being formed in sheets or other forms, and that both are highly inflammable and burn without leaving appreciable residues. From these substances I produce chemically-pure cellulose in an amorphous condition by treating them with suitable reducing agents, which, for convenience, I term "deoxidizing agents," the effect of such treatment being to deprive the collodion or the celluloid of their vitreous properties and bring them back to their original chemical condition as cellulose. This treatment consists in immersing the sheets or other forms of collodion or celluloid in a bath of ammonium sulphide, protochloride of iron, sulphate of iron, or other chemically-equivalent agents that effect the necessary reactions, allowing them to remain in the bath until the mass of collodion or celluloid has been entirely reconverted or deoxidized. The resulting product is then to be washed and dried, after which it is in condition for use.

It will thus be seen that, apart from the well-known steps necessary to the production of collodion or celluloid which have been specified, my process consists in treating either pure collodion, celluloid, or any other body that is pyroxyline without fiber by reducing agents that will reconvert them to the chemical condition of cellulose.

The article, when thus produced, being extremely dense, tenacious, and flexible, is applicable to the manufacture of belting and many other useful purposes. From its transparent qualities it may be used as a substitute for glass or mica in places where it is not likely to be exposed to abnormally-high temperatures. As a substance from which to prepare the carbons of electric lamps it is particularly well adapted, owing to certain remarkable qualities in the carbon which it produces. I would, however, state that its use in this connection is not specifically claimed herein, as the same is made the subject of another application of even date herewith.

I desire, further, to state that the process of manufacture above described may be varied in some respects, which are clearly within the scope of the invention as disclosed.

I do not, for instance, restrict myself to the specific manner of treating the collodion or celluloid with the reducing agents—in other words, to the manner of applying these agents to the said substances for the removal of their vitreous principles.

In preparing articles of pure amorphous cellulose, it is not essential that the cellulose be first produced and the articles then cut or shaped therefrom, as it is evident that the articles—such, for instance, as the blanks for incandescent carbon conductors—may be formed directly from the collodion or celluloid, and then immersed in one of the solutions named.

I am aware that heretofore soluble nitro-cellulose has been treated with ammoniacal salts for the purpose of rendering the same less explosive or inflammable. To this method or process, or to the product resulting therefrom, I do not lay claim.

Having now described my invention, what I claim as new, and desire to secure by Letters Patent, is—

1. As a new article of manufacture, non-fibrous or amorphous cellulose having the qualities of toughness and flexibility, as above set forth.

2. As a new article of manufacture, non-fibrous or amorphous transparent or translucent cellulose, substantially as described.

3. The method or process herein set forth of producing non-fibrous cellulose by treating collodion or celluloid with ammonium sulphide, protochloride of iron, or other chemically-equivalent reducing agents, substantially as described.

4. The method or process of producing non-fibrous cellulose, which consists in treating cellulose with a mixture of sulphuric and nitric acids for the production of pyroxyline, dissolving this by means of ether and alcohol, naphtha, or other solvents, for the production of collodion or celluloid, and treating these with ammonium sulphide, protochloride of iron, or other chemically-equivalent agents, substantially as hereinbefore described.

In testimony whereof I have hereunto set my hand this 6th day of March, 1882.

EDWARD WESTON.

Witnesses:
HENRY A. BECKMEYER,
JOHN P. DENGLER.